(12) United States Patent
Blom

(10) Patent No.: US 9,738,054 B2
(45) Date of Patent: Aug. 22, 2017

(54) TAILORED COEFFICIENT OF THERMAL EXPANSION OF COMPOSITE LAMINATES USING FIBER STEERING

(71) Applicant: The Boeing Company, Chicago, IL (US)

(72) Inventor: Adriana Willempje Blom, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 14/520,195

(22) Filed: Oct. 21, 2014

(65) Prior Publication Data

US 2016/0107413 A1   Apr. 21, 2016

(51) Int. Cl.
*B32B 5/12* (2006.01)
*B32B 15/14* (2006.01)
(Continued)

(52) U.S. Cl.
CPC ............... *B32B 5/12* (2013.01); *B32B 3/08* (2013.01); *B32B 5/142* (2013.01); *B32B 5/24* (2013.01); *B32B 5/26* (2013.01); *B32B 7/005* (2013.01); *B32B 7/02* (2013.01); *B32B 15/14* (2013.01); *B32B 37/144* (2013.01); *B32B 37/24* (2013.01); *B32B 38/1808* (2013.01); *B32B 41/00* (2013.01); *B32B 2260/023* (2013.01); *B32B 2307/30* (2013.01); *B32B 2307/732* (2013.01); *B32B 2309/06* (2013.01); *B32B 2309/70* (2013.01); *B32B 2311/00* (2013.01); *B32B 2605/18* (2013.01)

(58) Field of Classification Search
CPC ........................................................ B32B 5/12
USPC ............................................................ 428/105
See application file for complete search history.

(56) References Cited

U.S. PATENT DOCUMENTS 8,756,037 B2   6/2014   Rassaian et al.
2008/0160274 A1   7/2008   Dang

FOREIGN PATENT DOCUMENTS

DK   WO 2004078461 A1 *   9/2004   ......... B29C 66/1162
WO         2004078461 A1        9/2004

OTHER PUBLICATIONS

"European Application Serial No. 15190152.7, Search Report mailed Mar. 2, 2016", 7 pgs.
(Continued)

*Primary Examiner* — Brent O'Hern
(74) *Attorney, Agent, or Firm* — Kwan & Olynick LLP

(57) ABSTRACT

Provided are assemblies, each including a first structure having a uniform coefficient of thermal expansion (CTE) and a second composite structure having a variable CTE. Also provided are methods of forming such assemblies. The second structure has overlap, transition, and baseline regions. The overlap region directly interfaces the first structure and has a CTE comparable to that of the first structure. The baseline region is away from the first structure and has a different CTE. Each of these CTEs may be uniform in its respective region. The transition region may interconnect the baseline and overlap regions and may have gradual CTE change from one end to the other. The CTE variation with the second composite structure may be achieved by changing fiber angles in at least one ply extending through all three regions. For example, any of the plies may be subjected to fiber steering.

19 Claims, 7 Drawing Sheets

(51) Int. Cl.
*B32B 5/26* (2006.01)
*B32B 7/02* (2006.01)
*B32B 37/14* (2006.01)
*B32B 37/24* (2006.01)
*B32B 38/18* (2006.01)
*B32B 41/00* (2006.01)
*B32B 5/14* (2006.01)
*B32B 5/24* (2006.01)
*B32B 7/00* (2006.01)
*B32B 3/08* (2006.01)

(56) References Cited

OTHER PUBLICATIONS

Blom, A. W., "Structural Performance of Fiber-Placed, Variable-Stiffness Composite Conical and Cylindrical Shells", PhD Thesis, printed by Wohrmann Print Service, Zutphen, The Netherlands, 2010, 264 pgs.
Van Campen, Julien M. et al., "Design of Fiber-steered Variable-stiffness Laminates Based on a Given Lamination Parameters Distribution", 52nd AIAA/ASME/ASCE/AHS/ASC Structures, Structural Dynamics and Materials Conference 19th, Denver, CO, Apr. 2011, 11 pgs.

\* cited by examiner

| Circumferential CTE $\alpha_y$ (μin/in/F) | Radial Mismatch for $\Delta T = 495F$ $\Delta R$ (in) | Lowest Possible Poisson's Ratio $\nu_{xy}(-)$ |
|---|---|---|
| 0.9 | 0 | 0.78 |
| 0.8 | 0.08 | 0.74 |
| 0.7 | 0.16 | 0.68 |
| 0.6 | 0.24 | 0.62 |
| 0.5 | 0.33 | 0.54 |
| 0.4 | 0.41 | 0.45 |
| 0.3 | 0.49 | 0.32 |
| 0.2 | 0.57 | 0.17 |

FIG. 4

TAILORED COEFFICIENT OF THERMAL EXPANSION OF COMPOSITE LAMINATES USING FIBER STEERING

BACKGROUND

Different types of materials are often joined to complete an assembly. For example, composite parts and structures are often joined with metallic structures. However, the composite parts and structures may have coefficients of thermal expansion (CTE) that differ significantly, sometimes on orders of magnitude, from the CTE of joined metallic structures. In many applications, this may not be important because temperature variations are minimal. However in other applications, the materials may experience rapid heating and/or cooling over wide temperature ranges. For example, spacecraft applications expose various components to heating and cooling due to direct exposure to UV radiation or lack thereof. Having assemblies formed of two structures with significantly different CTEs in environments that undergo substantial temperature variations can lead to deleterious effects.

Additional interface structures may be used between composite structures and joined metallic structures to reduce stresses induced by varying thermal expansions. These additional interfaces may include adapters and spacers that allow some CTE mismatches. However, thermal expansion adapters may add significant weight to the overall assembly and increase costs. These thermal expansion adapters may be difficult to fabricate and may be prone to damage.

Consequently, it is desirable to provide new and improved solutions for joining composite structure with other structures having different CTEs such that these solutions account for varying coefficients of thermal expansion in a manner that overcomes drawbacks of existing mechanisms.

SUMMARY

Provided are assemblies, each including a first structure having a uniform coefficient of thermal expansion (CTE) and a second composite structure having a variable CTE. Also provided are methods of forming such assemblies. The second structure has overlap, transition, and baseline regions. The overlap region directly interfaces with the first structure and has a CTE comparable to that of the first structure. The baseline region is away from the first structure and has a different CTE. Each of these CTEs may be uniform in its respective region. The transition region may interconnect the baseline and overlap regions and may have gradual CTE change from one end to the other. The CTE variation with the second composite structure may be achieved by changing fiber angles in at least one ply extending through all three regions. For example, at least one of the plies may be subjected to fiber steering. The fiber-steered ply may be any ply in a composite structure, such as the ply closest to the first structure.

In some embodiments, an assembly includes a first structure and a second structure. The first structure has a first CTE that is substantially uniform throughout the entire volume of the first structure. The first structure may be formed from a metal, a composite material, or some other material suitable for a given application. The second structure is formed from a composite material that includes a first ply and a second ply. The first fiber ply and second fiber ply continuously extend through an overlap region, transition region, and baseline region of the second structure. The overlap region interfaces with the first structure. The baseline region is positioned away from the first structure. The transition region interconnects the overlap regions and the baseline regions. In some embodiments, a fiber angle in the overlap region in the first fiber ply is different from a fiber angle in the baseline region in the first fiber ply such that the overlap region of the second structure has a CTE (i.e., a second CTE) substantially matching the CTE of the first structure (i.e., the first CTE).

It should be noted that the second structure may have different CTE values in different directions, if the material forming the second structure is an anisotropic material. In this situation, the CTE of the second structure in one direction (i.e., the matching direction) may match the CTE of the first structure, while the CTE of the second structure in another direction (i.e., the nonmatching direction) may not match the CTE of the first structure. The matching direction may be in the direction of the longest overlap. For example, an overlap between the first structure and the second structure may have a cylindrical shape with the circumference being longer than the height of the cylinder. In this case, the matching direction may be the circumferential direction, while the non-matching direction may be the axial direction. Alternatively, this cylindrical overlap may have the circumference shorter than the height of the cylindrical overlap. In this case, the matching direction may be the axial direction, while the non-matching direction may be the circumferential direction. CTE values in different directions may be an order of magnitude different, in some embodiments. Furthermore, CTE values in different directions may have opposite signs. For example, a CTE in an axial direction may be positive, while a CTE in a circumferential may be negative or, vice versa.

In some embodiments, the difference in CTE values between the matching direction and nonmatching direction is less than 100% or, more specifically, less than 50%. Unless otherwise stated in this description, the comparison of CTE values between two components is performed along the matching direction. It should be also noted that the CTE values of the composite structure varies along the matching direction. For example, the CTE value in the matching direction in the overlap region (i.e., the second CTE) is different from the CTE value in the matching direction in the baseline region (i.e., the third CTE).

In some embodiments, the first fiber ply has fiber steering through the transition region. The fiber steering through the transition region may use one of a linear angle change. Alternatively, the fiber steering through the transition region may follow a path with a constant steering radius. Furthermore, the fiber path may be a spline representation.

In some embodiments, the second fiber ply has a third fiber angle in the overlap region different from a fourth fiber angle in the baseline region. The absolute value of the first fiber angle in the first fiber ply in the overlap region may be different from an absolute value of the third fiber angle in the second fiber ply in the overlap region.

In some embodiments, the second fiber ply has the same fiber angle in the overlap region and the baseline region. The assembly may include a third fiber ply and a fourth fiber ply. The first fiber angle may be selected to balance the value of the Poisson's ratio associated with the second structure and matching of the second CTE with the first CTE. For example, an exact match of the second CTE to the first CTE may result in a Poisson's ratio in the overlap region of the second structure being larger than 1. Allowing some mismatch between the second CTE and the first CTE can reduce the Poisson's ratio in the overlap region of the second structure to a value below 0.5, which may be more desirable for the integrity of the second structure.

In some embodiments, a method for designing a composite structure includes determining a first laminate layup and a second laminate layup, determining fiber angles, adjusting fiber angles, and implementing the first laminate layup. The first laminate layup in a first composite having an overlap region CTE for connection to a contacting structure. The second laminate layup having set characteristics may be determined based on structural requirements, such as laminate strength or structural stiffness. Fiber angles at an overlap region and at a baseline region in a first fiber ply in the first laminate layup are determined. Fiber angles at the overlap region are adjusted to allow for CTE mismatch in order to balance the Poisson's ratio. The first and second laminate layups and the transition from the first to the second laminate layup are implemented using fiber steering.

In some embodiments, the first fiber ply has fiber steering through the transition region. The fiber steering through the transition region may use one of a linear angle change. Alternatively, the fiber steering through the transition region may follow a path with a constant steering radius. Furthermore, the fiber path may be a spline representation.

In some embodiments, the second CTE in the circumferential direction of the second structure corresponds to the first CTE of the first structure. The first structure may comprise metal.

In some embodiments, the second fiber ply has a third fiber angle in the overlap region different from a fourth fiber angle in the baseline region. The absolute value of the first fiber angle in the first fiber ply in the overlap region may be different from an absolute value of the third fiber angle in the second fiber ply in the overlap region.

In some embodiments, the second fiber ply has the same fiber angle in the overlap region and the baseline region. The assembly may include a third fiber ply and a fourth fiber ply. The first fiber angle may be selected to balance the value of Poisson's ratio associated with the second structure and matching of the second CTE with the first CTE.

In some embodiments the number of plies in the overlap region of the second structure may be different from the number of plies in the baseline region. The second structure has at least one fiber ply that is continuous from the overlap region to the baseline region.

These and other embodiments are described further below with reference to the figures.

BRIEF DESCRIPTION OF THE DRAWINGS

FIG. 4 shows an example of balancing mismatched circumferential CTEs and Poisson's ratios, in accordance with some embodiments.

DETAILED DESCRIPTION OF EXAMPLE EMBODIMENTS

Figure 1:
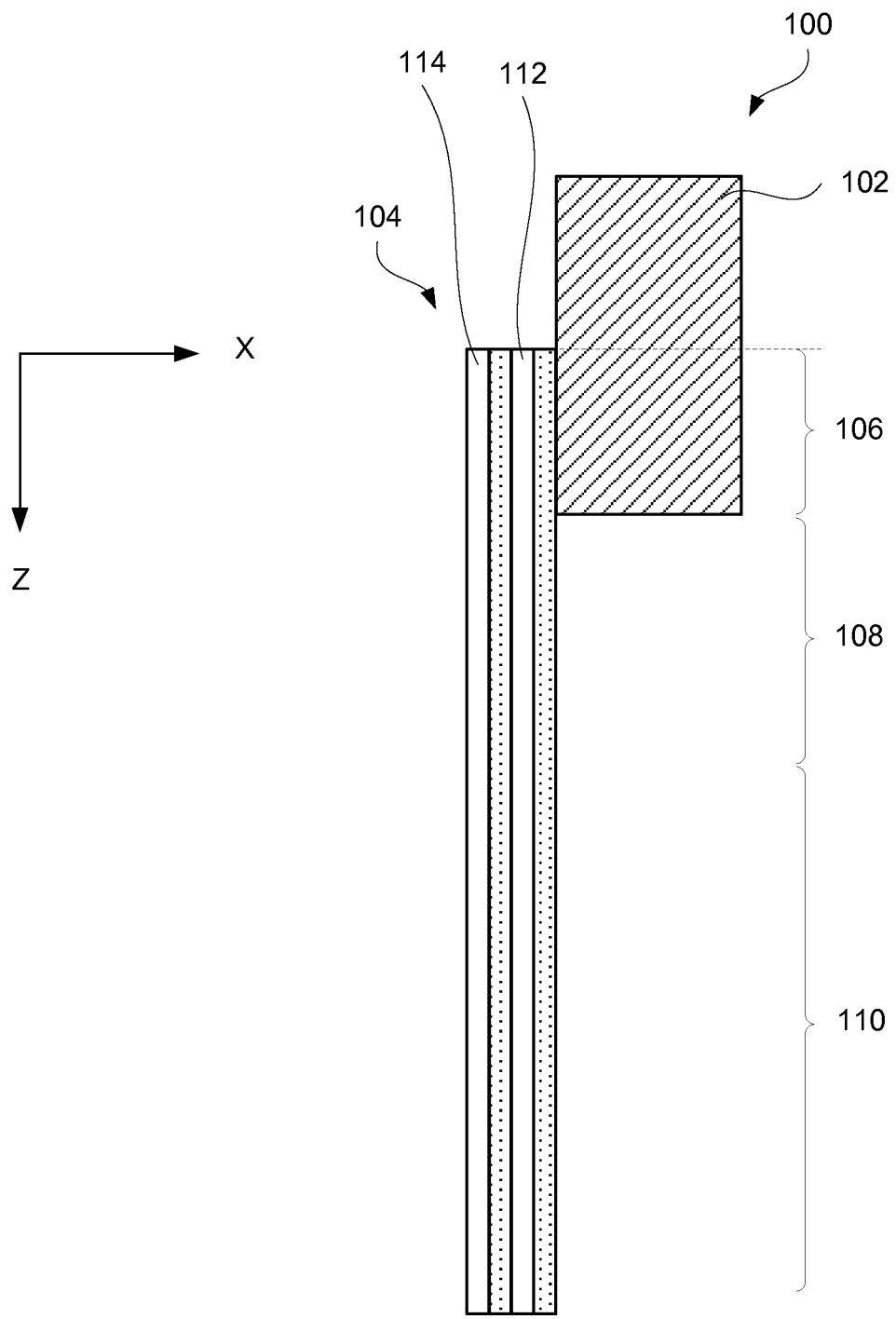
FIG. 1 illustrates one example of an assembly including a composite structure having different regions with different CTEs, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Different types of materials having different CTEs are often joined to create an assembly. For example, a composite material may be joined with another composite material or a metal. In particular examples, a hydrogen tank composite aft skirt may have a CTE mismatch with an aluminum hydrogen tank on a space bound assembly. Conventional techniques of forming such assemblies use an adapter, interface, or spacer that compensates for the CTE mismatch. However, these adapters, interfaces, or spacers may be difficult to manufacture and can add significantly to the weight of the overall assembly. In particular examples, an interface ring between an aluminum hydrogen tank and a hydrogen tank composite aft skirt can weigh over 500 lbs.

Various assemblies and methods described herein eliminate the need for or reduce the complexity of the additional adapters, interfaces, or spacers by tailoring the CTE of a region of a composite structure to the CTE of a material that this region directly interfaces. This region may be referred to as an overlap region. Another region of the composite structure that does not interface that material may have a different CTE. This region may be referred to as a baseline region. The composite structure is monolithic and may have continuous fiber extending through all regions regardless of their CTEs. In other words, the same fiber may start at the overlap region and extend into the baseline region. The CTE may gradually change from the overlap region interfacing the connecting structure to the baseline region, which is away from the connecting structure. The gradual change of CTE reduces the effects of CTE mismatch within the composite structure itself. A region where the CTE value gradually changes may be referred to as a transition region.

According to various embodiments, varying the CTE across different regions of the same composite structure may be accomplished by a technique of tailored fiber steering as the composite structure is fabricated. Specifically, a single laminate layer in the composite structure may be fiber steered using, for example, advanced fiber placement or continuous tow shearing. In other examples, multiple laminate layers may be fiber steered. Fiber steering of one or more laminate layers in a composite material may allow achieving a closer CTE match with a joined material, such as a metal. In some embodiments, a customized steered-fiber laminate (SFL) is provided to match the circumferential CTE of the composite with the CTE of a metal ring.

Furthermore, CTE matching may be balanced with other characteristics, such as Poisson's ratio. Specifically, varying the CTE across different regions of a composite structure using mechanisms, such as fiber steering, may lead to a significant increase in the Poisson's ratio. While a composite material may be quasi-isotropic in most regions of the composite structure not joined to a connecting structure (e.g., made from a metal), attempting to match the CTE in regions where the composite structure is joined with the connecting structure may result in a high Poisson's ratio. Steering multiple plies can effectively reduce the Poisson's ratio, but steering multiple plies increases manufacturing complexity. Consequently, various techniques are described for balancing the CTE mismatch with the Poisson's ratio.

FIG. 1 illustrates one example of an assembly having composite structure 104 having variable CTEs, in accordance with some embodiments. Specifically, composite structure 104 has overlap region 106 directly interfacing another structure 102, which may be referred to as connecting structure 102. The CTE of overlap region 106 may be substantially the same as the CTE of connecting structure 102. Composite structure also includes baseline region 110 having a CTE that is different from the CTE of overlap region 106. The CTE of overlap region 106 may be substantially constant. Likewise, the CTE of overlap region 106 may be substantially constant. Composite structure 104 may also include transition region 108 joining overlap region 106 and baseline region 110 and having a variable CTE. Specifically, one end of transition region 108 may have a CTE similar to that of overlap region 106, while the one end of transition region 108 may have a CTE similar to that of baseline region 110. As shown in FIG. 1, in the baseline region 110, the composite structure 104 doesn't contact structure 102.

Composite structure 104 may include multiple layers or plies such as first ply 112 and second ply 114. Orientations of fibers in each of first ply 112 and second ply 114 may be the same or different. The orientation of fibers in at least one of first ply 112 or second ply 114 may change from overlap region 106 to baseline region 110 using, for example, fiber steering.

It is recognized that the CTE in a particular direction, such as a circumferential direction, may be tailored using fiber steering in one or more plies of composite structure 104. In some embodiments, only one set of first ply 112 or second ply 114 plies is steered, and a quasi-isotropic layup would be maintained away from overlap region 106 in order to maintain the overall stiffness of composite structure 104. A traditional laminate having quasi-isotropic properties uses 0°, 90°, +/−45° and may be referred to as a 0, 90, +/−45 laminate. In some embodiments, composite structure 104 having quasi-isotropic properties at or near baseline region 110 would be a 0, 90, +/−45 laminate rotated by +/−22.5 degrees at or near overlap region 110. That is, $[\pm\theta_1, \pm\theta_2]$ layups with quasi-isotropic properties may specify either $\theta_1=22.5$ deg, $\theta_2=67.5$ deg; or $\theta_1=67.5$ deg, $\theta_2=22.5$ deg. Defining a quasi-isotropic laminate as a cross-ply laminate, i.e. as a $[\pm\theta_1, \pm\theta_2]$ laminate might facilitate the transition from one layup to another through fiber steering. According to various embodiments, a composite structure may include four plies with a balanced layup, $[\pm\theta_1, \pm\theta_2]$, where each of the fiber angles $\theta_1$ and $\theta_2$ is a function of location within the ply. Changing the angles within a laminate result in changing effective laminate properties, such as, but not limited to the modulus, the CTE or Poisson's ratio.

It is recognized that the CTEs of a composite laminate structure are defined as follows:

$$\begin{Bmatrix} \overline{\alpha}_x \\ \overline{\alpha}_y \\ \overline{\alpha}_{xy} \end{Bmatrix} = [A]^{-1} \int_{-h/2}^{h/2} [Q] \begin{Bmatrix} (\alpha_1 m^2 + \alpha_2 n^2) \\ (\alpha_1 n^2 + \alpha_2 m^2) \\ 2(\alpha_1 - \alpha_2)mn \end{Bmatrix} dz, \quad \text{(Equation 1)}$$

In Equation 1, $[A]^{-1}$ is the inverse of the in-plane laminate stiffness matrix A, [Q] is the rotated lamina stiffness matrix, $m=\cos\theta$, $n=\sin\theta$, h=laminate thickness, and $\alpha 1$ and $\alpha 2$ are CTEs of each ply in the fiber direction and transverse to the fiber direction respectively. Changing fiber angles in a composite layup results in a change in the A-matrix and in the m and n terms in Equation 1, thus leading to a change in CTEs. One of the CTEs, e.g. $\alpha_y$, can be matched to the CTE of the connecting structure using a numerical algorithm that searches for combinations of angles within the layup that result in the desired $\alpha_y$. There may be more than one layup that result in the same CTE value that have different A-matrices. Furthermore, there may be more than one layup that results in exactly the same A-matrix and the same CTE. A method that can be used to define the A-matrix and CTEs of a composite laminate to verify structural characteristics before explicitly defining a layup is the use of lamination parameters (LPs). The definition of LPs is well-known (see reference: Z. Gürdal, R. T. Haftka, P. Hajela, *Design and Optimization of Laminated Composite Materials*). The definition of the CTEs for a symmetric balanced laminate as a function of $V_1$ and $V_3$ can be simplified to:

$$\overline{\alpha}_x = \frac{V_1(K_2 U_1 - K_1 U_2 + K_2 U_4) - V_1^2 K_2 U_2 + 2K_1 U_3 V_3 + K_1(U_1 - U_4)}{2(2V_3 U_3(U_4 + U_1) - V_1^2 U_2^2 + (U_1^2 - U_4^2))}$$

$$\overline{\alpha}_y = -\frac{V_1(K_2 U_1 - K_1 U_2 + K_2 U_4) + V_1^2 K_2 U_2 - 2K_1 U_3 V_3 - K_1(U_1 - U_4)}{2(2V_3 U_3(U_4 + U_1) - V_1^2 U_2^2 + (U_1^2 - U_4^2))}$$

where $K_1 = (U_1 + U_4)(\alpha_1 + \alpha_2) + U_2(\alpha_1 - \alpha_2),$ $K_2 = U_2(\alpha_1 + \alpha_2) + (U_1 + 2U_3 - U_4)(\alpha_1 - \alpha_2),$ $K_3 = U_2(\alpha_1 + \alpha_2) + 2(U_3 + U_5)(\alpha_1 - \alpha_2),$ and $$U_1 = \frac{1}{8}(3Q_{11} + 3Q_{22} + 2Q_{12} + 4Q_{66}),$$

$$U_2 = \frac{1}{2}(Q_{11} - Q_{22}),$$

$$U_3 = \frac{1}{8}(Q_{11} + Q_{22} - 2Q_{12} - 4Q_{66}),$$

$$U_4 = \frac{1}{8}(Q_{11} + Q_{22} + 6Q_{12} - 4Q_{66}),$$

$$U_5 = \frac{1}{8}(Q_{11} + Q_{22} - 2Q_{12} + 4Q_{66}),$$

with $$Q_{11} = \frac{E_1}{1 - \nu_{12}\nu_{21}},$$

$$Q_{22} = \frac{E_2}{1 - \nu_{12}\nu_{21}}$$

$$Q_{12} = \frac{v_{12}E_2}{1-v_{12}v_{21}} = \frac{v_{21}E_1}{1-v_{12}v_{21}} \text{ and}$$

$$Q_{66} = G_{12}.$$

Figure 2A:
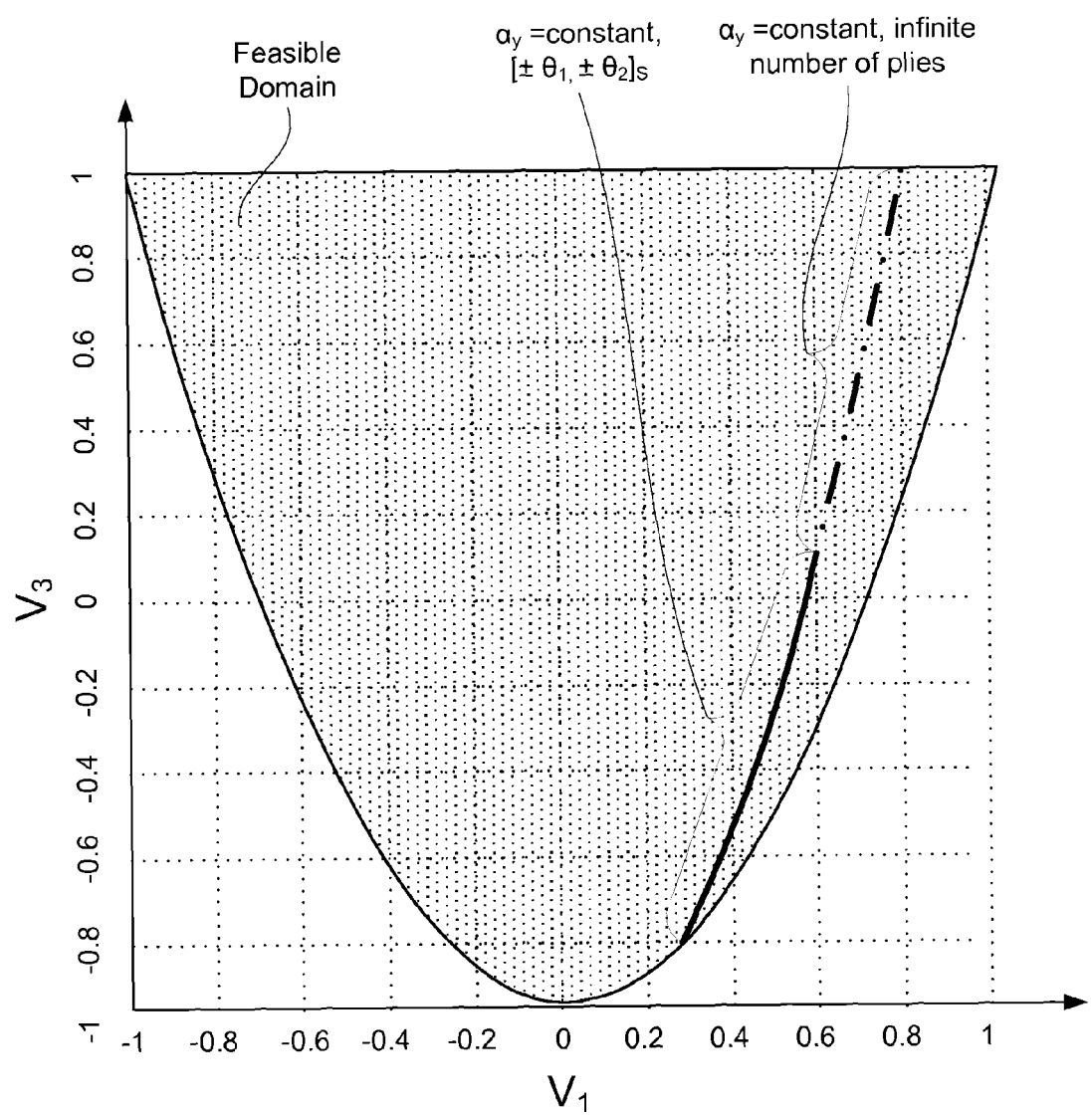
FIG. 2A is an example showing all possible combinations for the balanced symmetric lamination parameters resulting in a constant CTE, in accordance with certain embodiments.

An example showing all possible combinations for the balanced, symmetric LPs $V_1$ and $V_3$ resulting in a constant $\alpha_y$ are shown in FIG. 2A, which may be also referred to as the Miki diagram. Once the LPs are known, a matching stacking sequence can be found using methods known by those skilled in the art, for example, as described by Van Campen. More than one stacking sequence can exist for a given set of LPs when there are more than three distinct fiber orientations in a cross-ply laminate. This provides opportunity to pick fiber angles that result in minimum amount of fiber steering needed to transition from one laminate to the next.

The transition region 108 can be defined once layup candidates are determined for the overlap region 106 and the baseline region 108. Transitions between different fiber angles can be accomplished with advanced fiber placement. Varying layups in one or more plies across overlap region 106, transition region 108, and baseline region 110 may lead to different CTEs across the composite in these different areas or zones.

Figure 2B:
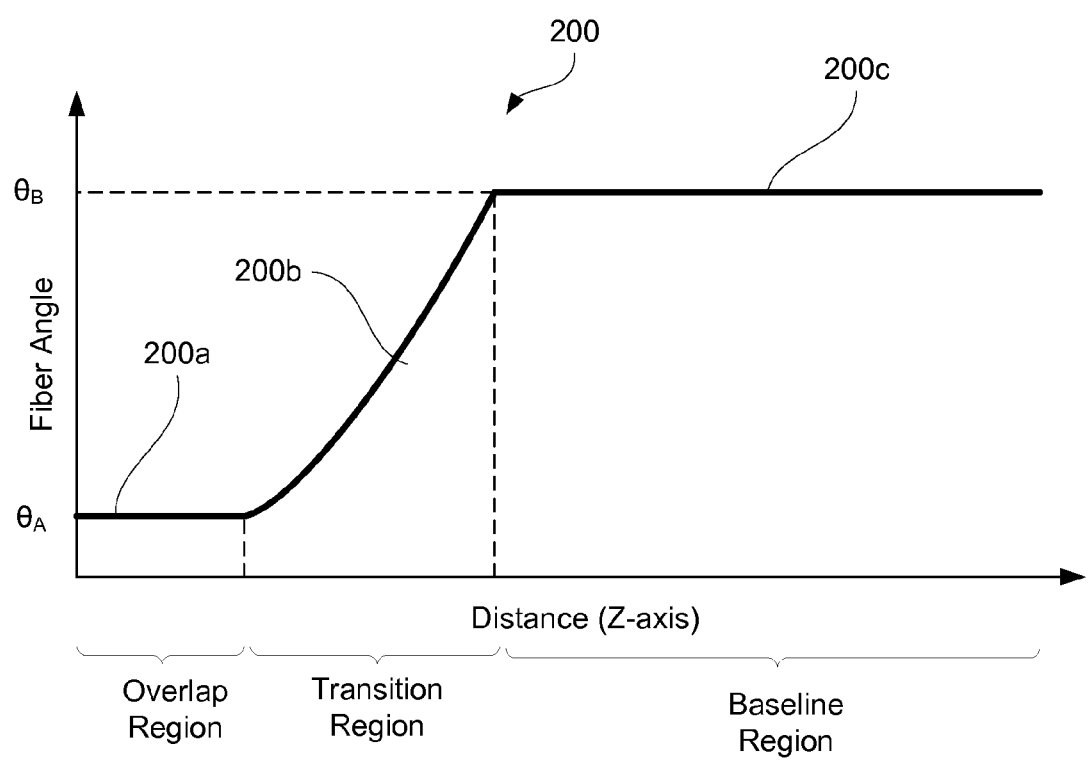
FIG. 2B is a graph illustrating an example of different fiber angles across different regions of a composite structure, in accordance with some embodiments.

FIG. 2B is graph 200 illustrating different fiber angles in a ply across different regions of a composite structure, in accordance with some embodiments. According to various embodiments, a first fiber angle at the overlap region may be $\theta_A$ (identified with 200a) while a second fiber angle at a baseline region is $\theta_B$ (identified with 200c), such that $\theta_B \neq \theta_A$. The first fiber angle at the overlap region ($\theta_A$) may be calculated based on equations presented above such that the CTE of at the overlap region corresponds to the CTE of another material connected to the composite. The second fiber angle at the baseline region ($\theta_B$) may be selected based on structural or some other considerations. A transition of a third fiber angle from $\theta_B$ to $\theta_A$ appears in the transition region and this transition is identified with 200b in FIG. 2B. Transition 200b may be gradual.

The properties of a composite laminate having multiple layers depend on characteristics (e.g. material properties, ply thickness and fiber angles) of each layer. It should be noted that a composite structure may have different numbers of plies in different regions, e.g., to allow thickness buildups if, for example, two parts are joined by a bolted connection. In this case, only the plies that are continuous from the overlap region to the baseline region may be subjected to fiber steering if the fiber angles are dissimilar.

Figure 3:
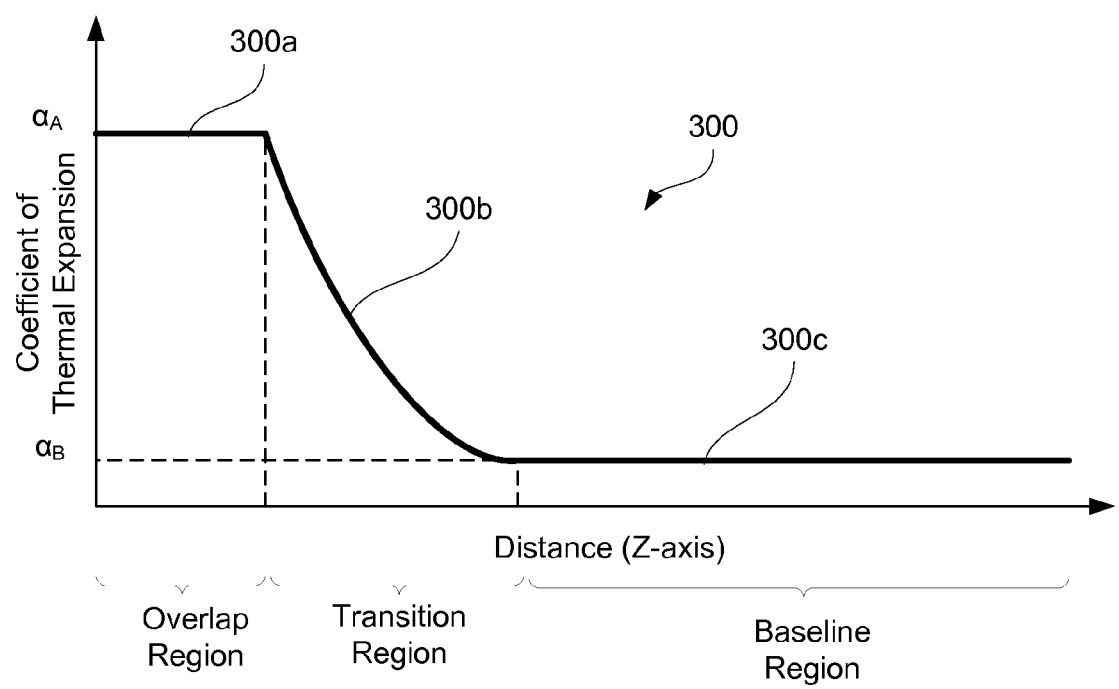
FIG. 3 is a graph illustrating an example of different CTEs across different regions of a composite structure, in accordance with some embodiments.

FIG. 3 is a graph illustrating CTE variations across different regions in a composite structure, in accordance with some embodiments. The CTE may vary because of different fiber angles in different regions of the composite structure as, for example, described above with reference to FIG. 2B. The second CTE of the overlap region ($\alpha_A$ identified with 300a) may be selected to match (e.g., be substantially the same as) the first CTE of the connecting structure. The third CTE of the baseline region ($\alpha_B$ identified with 300c) may be a result of particular design of the baseline region, which may be driven by structural integrity or other consideration (not matching to the first CTE of the connecting structure since the baseline region is away from the connecting structure). The fourth CTE of the transition region (identified with 300b) transitions from $\alpha_A$ to $\alpha_B$ due to fiber steering used for this region. Thus, the fourth CTE 300b can vary between the second CTE 300a and the third CTE 300c. In some embodiments, the second CTE of the overlap region may be closely matched to the first CTE of the connecting structure by steering a single ply within the composite structure. Alternatively, second the CTE of the overlap region may be closely matched to the first CTE of the connecting structure by steering two or more plies. For example, two plies ($\theta$ and $\theta'$) can be steered. In this example, the steering angle ($\theta$) in one ply is balanced by the steering angle ($\theta'$) in the other ply, such that $\theta_A'=-\theta_A$ and $\theta_B'=-\theta_B$, and $\theta'=-\theta$ everywhere else in the laminate.

Fiber steering in a composite structure may lead to a large Poisson's ratio for at least the overlapping region of the composite structure, which may be undesirable. In some embodiments, Poisson's ratio of the overlapping region of the composite structure is matched to the Poisson's ratio of the connecting structure. Since, CTE matching and Poisson's ratio matching may yield different results, weight factors may be assigned to each type of matching based, for example, on the application of the assembly to yield particular designs of fiber steering. For example, an acceptable Poisson's ratio can be achieved if some CTE mismatch is allowed. In particular examples involving a composite skirt and an aluminum tank, Poisson's ratio can be reduced to 0.54 if a radial CTE mismatch of 0.33" is allowed at a temperature gradient of 495° F. The CTE mismatch is reduced considerably compared to the reference 0.9" radial mismatch when fiber steering is not used.

FIG. 4 shows balancing of mismatched circumferential CTEs and Poisson's ratios for a particular example. Circumferential CTEs shown in column 402 correspond to radial mismatches 404. The lowest possible Poisson's ratio for the given circumferential CTE is noted in column 406. It is recognized that it may be desirable to balance the need for reduced radial mismatches with the need for a reduced Poisson's ratio. It may be possible to select acceptable levels of mismatch in CTE with acceptable Poisson's ratios. In particular embodiments, a radial thermal mismatch of 0.33" corresponds to a Poisson's ratio of 0.54 and a circumferential CTE of 0.5 (μin/in/F) allowed at ΔT=495 F.

Figure 5:
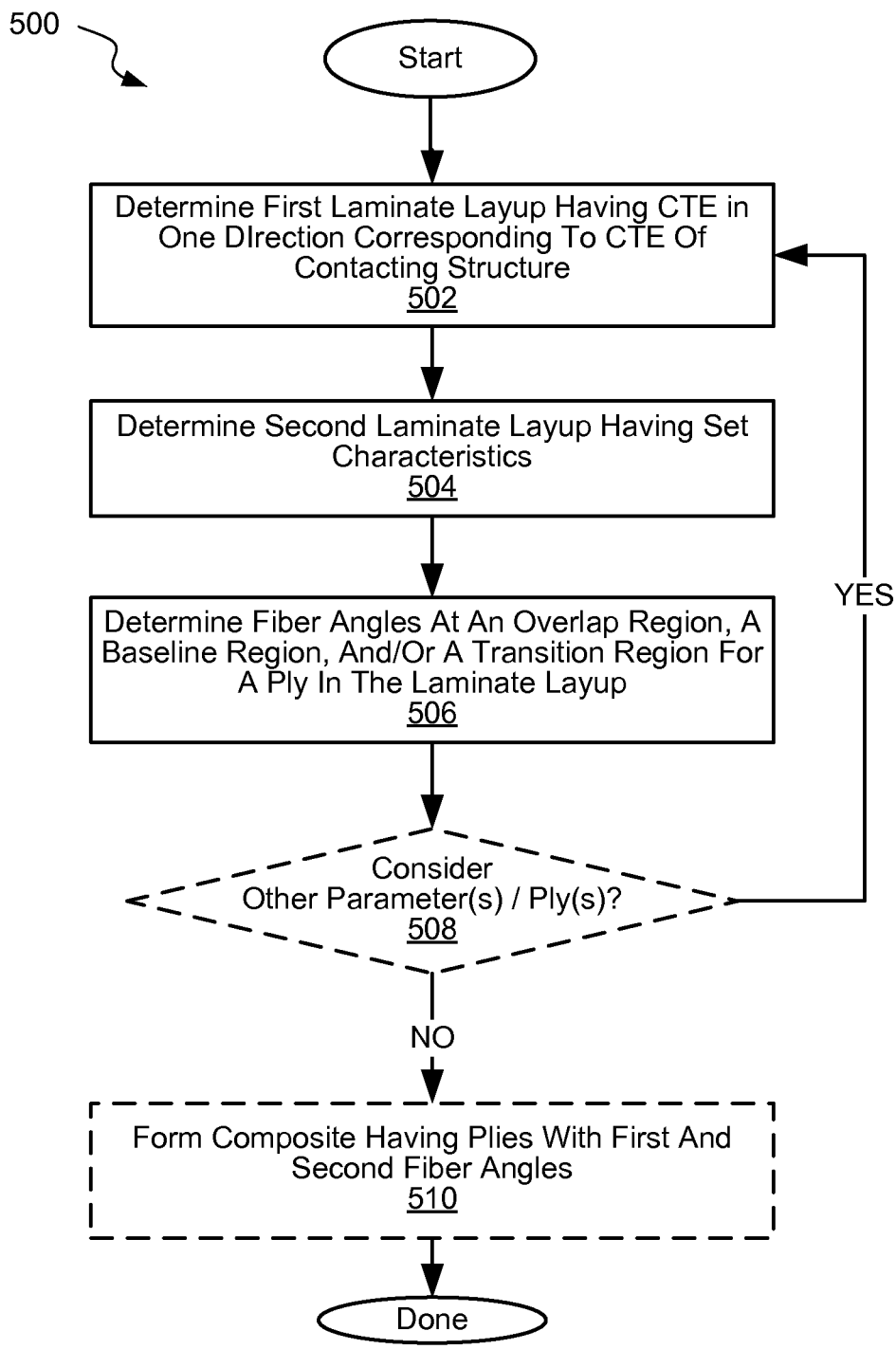
FIG. 5 illustrates one example of a process for matching the CTE of a composite structure with the CTE of a joined structure, in accordance with some embodiments.

FIG. 5 illustrates one example of process 500 used for matching a CTE of a composite structure to the CTE of a connected structure, in accordance with some embodiments. At 502, a first laminate layup having a CTE corresponding to the CTE of the contacting structure is determined. It should be noted that the CTE need not be a perfect match, as a certain level of mismatch may be tolerated for other reasons, such as ease of manufacturing or reduced Poisson's ratios. At 504, a second laminate layup having set characteristics is determined. According to various embodiments, a composite may have two or more plies. However, fiber steering may only be necessary in some of the plies in the laminate in some embodiments. However, it is recognized that fiber steering can be used in multiple plies. At 506, fiber angles at an overlap region, a baseline region, and/or a transition region for a ply in the laminate layup are determined. In many instances, fiber steering is used to change the fiber angle from an angle in the overlap region to the angle in the baseline region. At 508, other parameters and plies are considered. According to various embodiments, modifying fiber angles in multiple plies increases manufacturing complexity, but can improve effective laminate properties of the composite. In particular embodiments, an iterative process is used to identify acceptable combinations of fiber angles and Poisson's ratios at various temperature ranges. In other embodiments the laminate modulus or bending stiffness might be taken into consideration. If no other parameters or plies need to be considered, a composite having laminate layers with determined fiber angles are manufactured at 510.

Figure 6A:
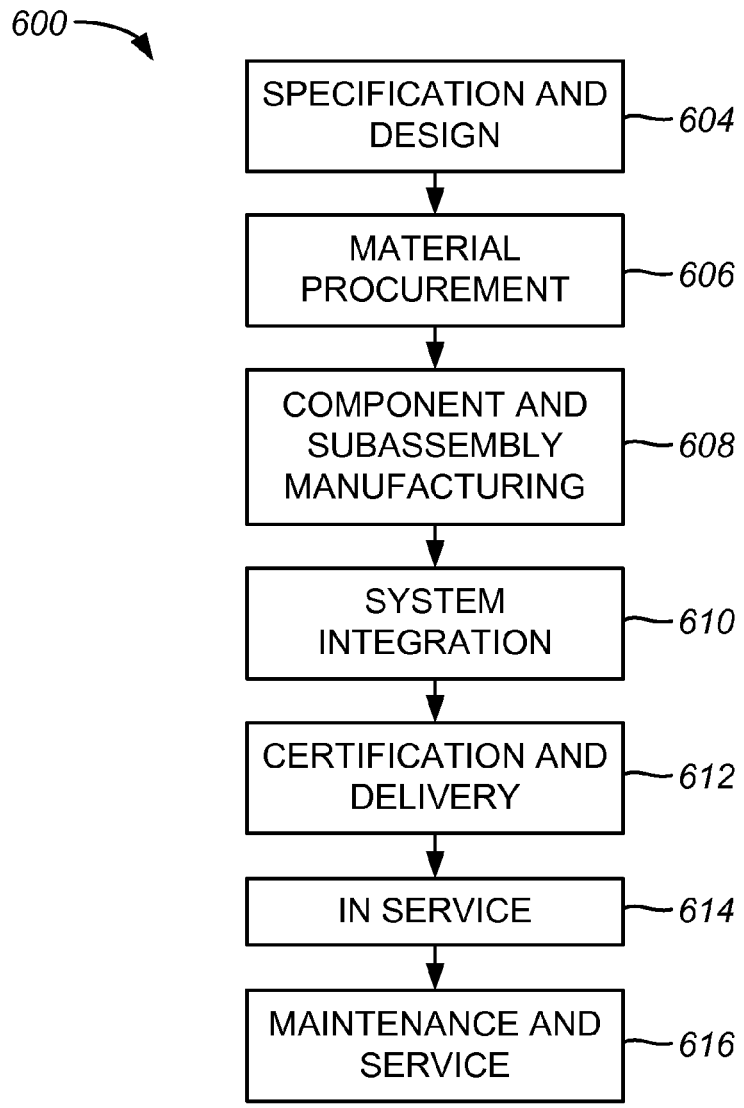
FIG. 6A is a process flowchart reflecting key operations in the life cycle of a spacecraft from early stages of manufacturing to entering service, in accordance with some embodiments.

A spacecraft manufacturing and service method 600 shown in FIG. 6A and a spacecraft 630 shown in FIG. 6B will now be described to better illustrate various features of processes and systems presented herein. During pre-production, spacecraft manufacturing and service method 600 may include specification and design 602 of spacecraft 630 and material procurement 604. The production phase involves component and subassembly manufacturing 606 and system integration 608 of spacecraft 630. Thereafter, spacecraft 630 may go through certification and delivery 610 in order to be placed in service 612. While in service by a customer, spacecraft 630 is scheduled for routine maintenance and service 614 (which may also include modification, reconfiguration, refurbishment, and so on). While the embodiments described herein relate generally to component and subassembly manufacturing of a spacecraft, they may be practiced at other stages of the spacecraft manufacturing and service method 600.

Each of the processes of spacecraft manufacturing and service method 600 may be performed or carried out by a system integrator, a third party, and/or an operator (e.g., a customer). For the purposes of this description, a system integrator may include, without limitation, any number of spacecraft manufacturers and major-system subcontractors; a third party may include, for example, without limitation, any number of vendors, subcontractors, and suppliers; and an operator may be a government entity, leasing company, military entity, service organization, and so on.

Figure 6B:
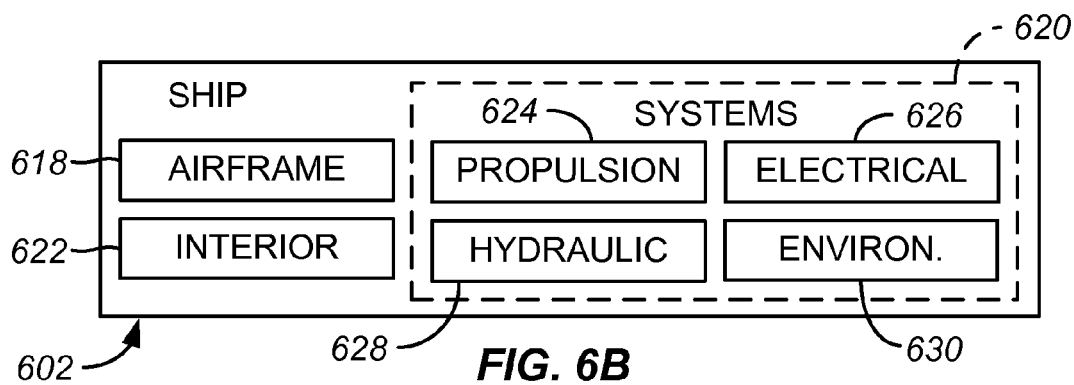
FIG. 6B is a block diagram illustrating various key components of a spacecraft, in accordance with some embodiments.

As shown in FIG. 6B, spacecraft 630 produced by spacecraft manufacturing and service method 600 may include airframe 632, interior 636, and multiple systems 634. Examples of systems 634 include one or more of propulsion system 638, electrical system 640, hydraulic system 642, and environmental system 644. Any number of other systems may be included in this example. Although a spacecraft example is shown, the principles of the disclosure may be applied to other industries, including the aerospace, airline, oil and gas, and automotive industries.

Apparatus and methods embodied herein may be employed during any one or more of the stages of spacecraft manufacturing and service method 600. For example, without limitation, components or subassemblies corresponding to component and subassembly manufacturing 606 may be fabricated or manufactured in a manner similar to components or subassemblies produced while spacecraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of spacecraft 630. Similarly, one or more of apparatus embodiments, method embodiments, or a combination thereof may be utilized while spacecraft 630 is in service, for example, without limitation, to maintenance and service 614 may be used during system integration 608 and/or maintenance and service 614 to determine whether parts may be connected and/or mated to each other.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An assembly comprising:
    a first structure having a first coefficient of thermal expansion (CTE),
        wherein the first CTE is substantially uniform throughout an entire volume of the first structure; and
    a second structure formed from a composite material comprising a first fiber ply and a second fiber ply,
        wherein the first fiber ply and the second fiber ply continuously extend through an overlap region, a transition region, and a baseline region of the second structure,
        wherein, in the overlap region, a portion of the second structure contacts the first structure,
        wherein, in the baseline region, the second structure is positioned away from the first structure such that the second structure doesn't contact the first structure,
        wherein the transition region interconnects the overlap region and the baseline region, and
        wherein a first fiber angle in the overlap region in the first fiber ply is different from a second fiber angle in the baseline region in the first fiber ply such that
            the overlap region of the second structure has a second CTE substantially matching the first CTE and
            the baseline region of the second structure has a third CTE substantially different from the second CTE and the first CTE.

2. The assembly of claim 1, wherein the first fiber ply has fiber steering through the transition region.

3. The assembly of claim 2, wherein the fiber steering through the transition region utilizes one of a linear angle change, a constant steering radius, and a spline representation.

4. The assembly of claim 1, wherein the second CTE of the second structure differs in two orthogonal directions, wherein the two orthogonal directions comprise a circumferential direction and an axial direction.

5. The assembly of claim 1, wherein the first structure comprises a metal.

6. The assembly of claim 1, wherein the second fiber ply has a third fiber angle in the overlap region and a fourth fiber angle in the baseline region, and wherein the third fiber angle is different from the fourth fiber angle.

7. The assembly of claim 6, wherein an absolute value of the first fiber angle in the first fiber ply in the overlap region is different from an absolute value of the third fiber angle in the second fiber ply in the overlap region.

8. The assembly of claim 1, wherein the second fiber ply has a third fiber angle in the overlap region and the baseline region.

9. The assembly of claim 1, further comprising a third fiber ply and a fourth fiber ply.

10. The assembly of claim 1, wherein the first fiber angle is selected to balance a value of Poisson's ratio associated with the second structure and matching of the second CTE with the first CTE.

11. The assembly of claim 1, wherein the first structure is formed from a second composite material.

12. The assembly of claim 1, wherein the overlap region directly interfaces with the first structure.

13. The assembly of claim 1, wherein the second structure is monolithic.

14. The assembly of claim 1, wherein the first fiber angle is constant in the overlap region in the first fiber ply, wherein the second fiber angle is constant in the baseline region in the first fiber ply and wherein, in the transition region, a third fiber angle varies between the first fiber angle and the second fiber angle.

15. The assembly of claim 1, wherein, in the transition region, a fourth CTE varies between the second CTE and the third CTE.

16. The assembly of claim 1, wherein the first structure is an aluminum hydrogen tank of a spacecraft, and wherein the second structure is a tank aft skirt of the spacecraft.

17. The assembly of claim 1, wherein the first CTE is the same in all directions.

18. The assembly of claim 1, wherein an overlap between the first structure and the second structure has a cylindrical shape.

19. The assembly of claim 1, wherein the composite material is anisotropic.

\* \* \* \* \*